US011038826B2

(12) United States Patent
Skudlark et al.

(10) Patent No.: US 11,038,826 B2
(45) Date of Patent: *Jun. 15, 2021

(54) CLOUD-BASED SPAM DETECTION

(71) Applicant: AT&T Intellectual Property I, L.P., Atlanta, GA (US)

(72) Inventors: Ann E. Skudlark, San Ramon, CA (US); Lien K. Tran, Chatham, NJ (US); Yu Jin, Foster City, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,056

(22) Filed: Jun. 15, 2020

(65) Prior Publication Data

US 2020/0314047 A1  Oct. 1, 2020

Related U.S. Application Data

(63) Continuation of application No. 15/910,289, filed on Mar. 2, 2018, now Pat. No. 10,721,197, which is a continuation of application No. 14/543,364, filed on Nov. 17, 2014, now Pat. No. 9,942,182.

(51) Int. Cl.
| | |
|---|---|
| *H04L 12/58* | (2006.01) |
| *H04W 4/14* | (2009.01) |
| *G06F 9/455* | (2018.01) |
| *H04L 29/06* | (2006.01) |

(52) U.S. Cl.
CPC .......... *H04L 51/12* (2013.01); *H04L 63/1408* (2013.01); *H04W 4/14* (2013.01); *G06F 9/45533* (2013.01); *G06F 9/45558* (2013.01); *G06F 2009/45595* (2013.01); *H04L 51/38* (2013.01)

(58) Field of Classification Search
None
See application file for complete search history.

(56) References Cited

U.S. PATENT DOCUMENTS

| | | |
|---|---|---|
| 7,555,523 B1 | 6/2009 | Hartman |
| 7,630,727 B2 | 12/2009 | Cai et al. |
| 7,792,912 B2 | 9/2010 | Britton |
| 8,280,968 B1 | 10/2012 | Duan |
| 8,321,936 B1 | 11/2012 | Green |
| 8,402,529 B1 | 3/2013 | Green |

(Continued)

*Primary Examiner* — Joshua Joo
(74) *Attorney, Agent, or Firm* — Guntin & Gust, PLC; Mark Wilinski

(57) ABSTRACT

A cloud based mobile internet protocol messaging spam defense. Short message service (SMS) messages are analyzed by a cloud based virtual machine to determine if should be considered potentially unwanted messages (e.g., spam). The cloud based virtual machine uses a user specific algorithm for determining if a message should be considered to be a potentially unwanted message. Messages that are determined to be potentially unwanted messages trigger a notification to be sent to a user device associated with the virtual machine. The notification requests confirmation from the user that the potentially unwanted message is an unwanted message. The user's response to a request for confirmation is then used to update an unwanted message database associated with the user and the user device.

20 Claims, 3 Drawing Sheets

(56) References Cited

U.S. PATENT DOCUMENTS

| | | |
|---|---|---|
| 8,621,630 B2 | 12/2013 | Economos et al. |
| 8,635,079 B2 | 1/2014 | McDougal et al. |
| 8,655,959 B2 * | 2/2014 | Yadava ................. H04L 63/145 709/206 |
| 8,661,547 B1 | 2/2014 | Kononov et al. |
| 8,689,330 B2 | 4/2014 | Sinn et al. |
| 8,732,827 B1 | 5/2014 | Zhukov et al. |
| 9,609,007 B1 | 3/2017 | Rivlin |
| 10,027,690 B2 | 7/2018 | Aziz |
| 10,523,609 B1 | 12/2019 | Subramanian |
| 2002/0116463 A1 * | 8/2002 | Hart ................... H04M 1/2478 709/206 |
| 2004/0019651 A1 * | 1/2004 | Andaker ................. H04L 51/12 709/207 |
| 2005/0015454 A1 * | 1/2005 | Goodman ............... H04L 51/12 709/207 |
| 2006/0155808 A1 * | 7/2006 | Irlam ..................... H04L 51/12 709/203 |
| 2006/0168031 A1 | 7/2006 | Cai |
| 2006/0242708 A1 | 10/2006 | Oswall |
| 2007/0013324 A1 | 1/2007 | Ubelein |
| 2007/0208868 A1 * | 9/2007 | Kidd .................... G06Q 10/107 709/229 |
| 2008/0127345 A1 | 5/2008 | Holtmanns |
| 2008/0163372 A1 | 7/2008 | Wang |
| 2008/0196104 A1 | 8/2008 | Tuvell et al. |
| 2008/0250084 A1 | 10/2008 | Polimeni |
| 2009/0132669 A1 | 5/2009 | Milliken |
| 2009/0222922 A1 | 9/2009 | Sidiroglou |
| 2009/0260085 A1 | 10/2009 | Kim |
| 2009/0282112 A1 | 11/2009 | Prakash |
| 2011/0004877 A1 * | 1/2011 | Wu ......................... H04L 49/00 718/1 |
| 2011/0119343 A1 | 5/2011 | Marino |
| 2011/0238765 A1 | 9/2011 | Wilson |
| 2011/0289169 A1 | 11/2011 | Lee |
| 2011/0314546 A1 | 12/2011 | Aziz |
| 2012/0030293 A1 | 2/2012 | Bobotek |
| 2012/0150967 A1 | 6/2012 | Cai |
| 2012/0185551 A1 | 7/2012 | Hart |
| 2012/0215862 A1 | 8/2012 | Cai et al. |
| 2012/0254335 A1 | 10/2012 | Martin |
| 2013/0018972 A1 | 1/2013 | Sargent |
| 2013/0191506 A1 | 7/2013 | Polis |
| 2013/0246536 A1 | 9/2013 | Yadava |
| 2013/0254880 A1 | 9/2013 | Alperovitch et al. |
| 2013/0263015 A1 | 10/2013 | Doudkin |
| 2014/0128047 A1 | 5/2014 | Edwards |
| 2015/0074802 A1 | 3/2015 | Sanjeev |
| 2015/0100894 A1 | 4/2015 | Kumar |
| 2016/0212012 A1 | 7/2016 | Young |

* cited by examiner

CLOUD-BASED SPAM DETECTION

CROSS-REFERENCE TO RELATED APPLICATIONS

This patent application is a continuation of U.S. application Ser. No. 15/910,289 filed Mar. 2, 2018 and since issued as U.S. Pat. No. 10,721,197, which is a continuation of U.S. application Ser. No. 14/543,364 filed Nov. 17, 2014 and since issued as U.S. Pat. No. 9,942,182, with both patent applications incorporated herein by reference in their entireties.

BACKGROUND

The present disclosure relates generally to telecommunications, and more particularly to cloud based mobile messaging spam detection and defense.

Mobile devices have become a ubiquitous means of communication. Cell phones are estimated to be at near 100% penetration in the United States, with approximately half of these devices being smart phones. Globally, over 1.6 billion mobile phones and 66.9 million tablets are in use. This increase in the use of mobile devices leads to an increase of communication via Short Messaging Service (SMS) and Internet Protocol Messaging (IP-messaging). These increases also allow for more mobile messaging exploits and abuses. SMS spam has risen 45% to 4.5 billion messages. Approximately 69% of mobile users have received text spam (also referred to as unwanted messages) in one year according to some accounts. In addition, the proliferation of IP Based Text messaging applications brings further growing vulnerability to mobile customers. Fake voicemail notifications have delivered malware that was identified as a Trojan designed to steal passwords and other confidential data. In addition, spam is spreading via various chat and messaging applications.

Defenses of IP-based mobile messaging spam vary across different service providers. Most providers allow customers to report spam activities. However, this method is known to have a low reporting rate and a high detection delay. Moreover, malicious users may manipulate such a defense system to cause denial-of-service of legitimate accounts.

Another issue is that mobile users tend to install multiple IP messengers as well as using SMS and Multimedia Messaging Service (MIMS) services simultaneously. Since most messenger providers are operated independently, they do not ensure equivalent levels of security. As such, the least secured app becomes the weak link and determines the ultimate security of the mobile device regardless of the performance of the anti-spam systems provided by the other apps. In addition, independent spam defenses from different providers render spam detection less effective because many spammers launch similar spam campaigns simultaneously on multiple apps and even through SMS and MMS.

SUMMARY

This disclosure addresses the problems in existing solutions utilizing a cloud based mobile messaging spam detection and defense with a user friendly and comprehensive spam detection and reporting methodology. In one embodiment, a short message service message is analyzed at a virtual machine associated with a user device and a recipient. The virtual machine is separate from the user device and is associated with both the user device and a recipient of the short message service message. The virtual machine identifies the short message service message as a potentially unwanted message and confirmation that the potentially unwanted message is an unwanted message is requested from the recipient. In one embodiment, the identifying is based on a crowd-sourced identification of the short message service message as a potentially unwanted message. In one embodiment, a list of a plurality of messaging accounts associated with the recipient is determined based on a scan of a user device associated with the recipient and user credentials associated with one of the plurality of messaging accounts is requested from the user. The user credentials may then be used to log in to the related account. In one embodiment, an unwanted message algorithm associated with the recipient is updated in response to confirmation that the potentially unwanted message is an unwanted message. The algorithm may be updated based on one of a sender of the unwanted message, content of the unwanted message, and a content pattern of the unwanted message. The identifying the short message service message as a potentially unwanted message may be further based on feedback previously provided by the recipient in response to previous requests for confirmation.

A system and computer readable medium for cloud based mobile messaging spam detection and defense are also described herein.

DETAILED DESCRIPTION

Figure 1:
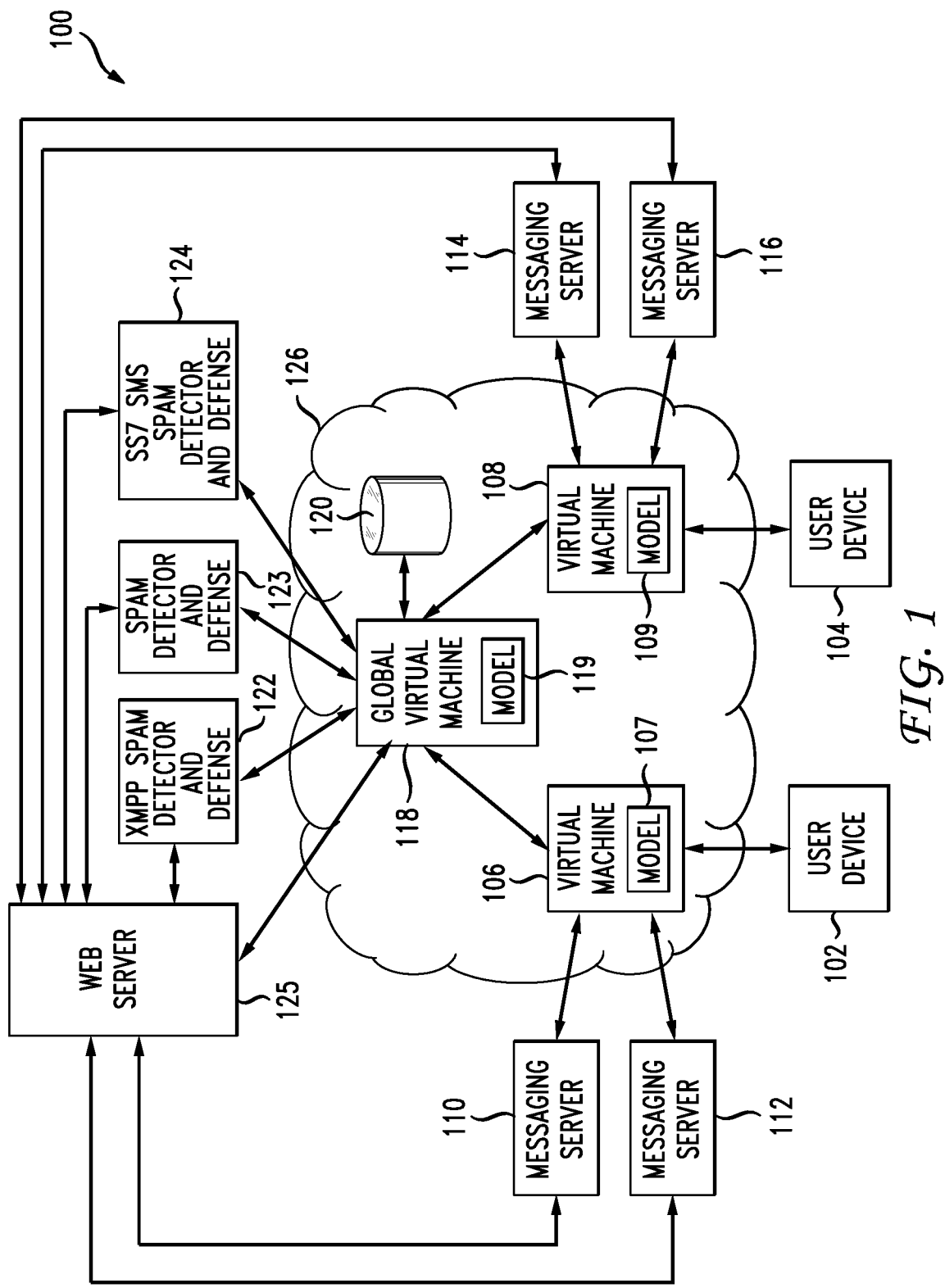
FIG. 1 depicts a system for a cloud based mobile internet protocol messaging spam defense.

FIG. 1 depicts a system 100 for a cloud based mobile internet protocol messaging spam defense. Short message service (SMS) messages are analyzed by a cloud based virtual machine to determine if a message should be considered potentially unwanted messages (e.g., spam). The cloud based virtual machine uses a user specific algorithm for determining if a message should be considered to be a potentially unwanted message. Messages that are determined to be potentially unwanted messages trigger a request for confirmation to be sent to a user device associated with the virtual machine. The request for confirmation requests confirmation from the user that the potentially unwanted message is an unwanted message. The user's response to a request for confirmation is then used to update an unwanted message database associated with the user and the user device.

FIG. 1 depicts user devices 102, 104 each of which is associated with a particular user. Mobile device 102 is a smart phone and mobile device 104 is a tablet, however, each user device may be any type of device capable of receiving messages such as short message service (SMS) messages, messages associated with chat programs, and other messages associated with various applications and/or programs. User devices 102, 104 may be smart phones, cell phones, hand-held computers, tablets, etc. User devices 102, 104 each execute a client program configured to facilitate user notifications to a user associated with a respective user device.

User device 102 is in communication with virtual machine 106. User device 104 is in communication with virtual machine 108. Virtual machines 106, 108 are shown in FIG. 1 located in a cloud 126 remote from user devices 102, 104. Virtual machines 106,108 each store and maintain unwanted message detection algorithms which are depicted in FIG. 1 as models 107, 109. As used herein, a "cloud" is a collection of resources located separate from other devices which utilize the collection of resources. Resources in a cloud can comprise one or more computing devices. As used herein, a virtual machine is a program or application that appears to be an individual resource but is actually a program designed to operate as an individual resource, such as a computer, on a resource. As shown in FIG. 1, virtual machine 106 is associated with mobile device 102 and virtual machine 108 is associated with mobile device 104.

Each virtual machine 106, 108 is in communication with global virtual machine 118 having global model 119 which receives information from virtual machines 106, 108 concerning unwanted messages (i.e., spam). In one embodiment, virtual machines 106, 108 and global virtual machine 118 are located on the same hardware resource and communicate with one another within the confines of the hardware resource. In one embodiment, virtual machines 106, 108 operate on hardware different from hardware on which global virtual machine 118 operates. In such embodiments, virtual machines 106, 108 and global virtual machine 118 communicate with one another via any communication protocol and medium. It should be noted that various combinations of machines and hardware may be used to implement global virtual machine 118 and virtual machines 106, 108.

Global model 119 of global virtual machine 118 compiles information concerning unwanted messages (e.g., a set of global classification rules) based on information received from mobile devices 102, 104 as well as additional mobile devices (not shown). Global model 119 of global virtual machine 118 is in communication with database 120 which stores the information concerning unwanted messages compiled by global virtual machine 118. Global model 119 of global virtual machine 118 is in communication with an extensible messaging and presence protocol (XMPP) spam detector and defense 122, spam detector and defense 123, and a signaling system 7 (SS7) SMS spam detector and defense 124 (also referred to herein as XMPP spam detector 122, spam detector 123, SS7 SMS spam detector 124). In one embodiment, XMPP spam detector 122, spam detector 123, SS7 SMS spam detector 124 are network spam detectors that global virtual machine 118 is configured to communicate with. In such embodiments, information determined by, or communicated to, global model 119 of global virtual machine 118 may be transmitted to XMPP spam detector 122, spam detector 123, and SS7 SMS spam detector 124 in an appropriate format. Similarly, information determined by XMPP spam detector 122, spam detector 123, and/or SS7 SMS spam detector 124 may be communicated to global model 119 global virtual machine 118 in an appropriate format. It should be noted that spam detector 123 represents a generic spam detector which can be configured to detect spam sent via protocols other than XMPP or SS7 SMS. Each of XMPP spam detector 122, spam detector 123, and SS7 SMS spam detector 124 are in communication with web server 125 which, in one embodiment, supports messaging using one or more protocols. It should be noted that spam detection and defense (e.g. blocking/filtering) can take place at one or more of XMPP spam detector 122, spam detector 123, SS7 SMS spam detector 124, messaging servers 110,112, 114,116, and virtual machines 106,108.

Virtual machine 106 is in communication with messaging servers 110, 112. Similarly, virtual machine 108 is in communication with messaging servers 114, 116. All messages from messaging servers 110, 112 to user device 102 are received by virtual machine 106 for analysis using model 107 before transmission to user device 102. Similarly, all messages from messaging servers 114, 116 to user device 104 are received by virtual machine 108 for analysis using model 109 before transmission to user device 104. Messaging servers 110, 112, 114, and 116 are servers that support the transmission of messages between user devices. The messaging servers may be stand-alone messaging servers that only facilitate the transmission of messages or may be associated with other services, such as social networks. In one embodiment, virtual machines 106, 108 communicate with messaging servers 110, 112, 114, and 116 via application program interfaces (API). The APIs can be provided by the messaging servers and be used by virtual machines 106, 108 to access messages directed to users associated with a user device (e.g., user devices 102, 104).

It should be noted that web server 125 is distinguished from messaging servers 110, 112, 114, and 116, in that web server 125 can support an entire website for an application such as a social networking website while one or more of messaging servers 110, 112, 114, and 116 may be associated with web server 125. For example, messaging server 110 can be associated with a social networking website supported by web server 125. As such, communication between web server 125 and one or more of XMPP spam detector 122, spam detector 123, and SS7 SMS spam detector 124 can be used to facilitate blocking spam by web server 125 locking or deleting accounts that have been determined to be sending spam. For example, information from one or more of XMPP spam detector 122, spam detector 123, and SS7 SMS spam detector 124 can be used to identify and block or delete a user account of a social networking website that sends an unacceptable amount of spam. Such measures may be deemed necessary when a predetermined number of users identify communications from such a user account to be spam. For example, if 99 out of 100 users have flagged messages from a particular account to be spam, web server 125 can block or delete the offending account in order to eliminate the spam at its source.

Each of user devices 102, 104 may be associated with the same user or different users. In one embodiment, each virtual machine (e.g., virtual machines 106, 108) and associated model (e.g., models 107, 109) are associated with a particular device. As such, a particular device is associated with a particular virtual machine and a particular model and the particular device may be one of a plurality of devices associated with a particular user. In one embodiment, a virtual machine contains multiple models and supports multiple devices. In one embodiment, these devices are typically owned by or otherwise associated with a single user. In other embodiments, each of the multiple models on a single virtual machine can be associated with different users. In one embodiment, a single model may be associated with multiple devices. However, since many users may want different filtering for devices associated with work and devices associated with personal use, different devices can be associated with different models. In one embodiment, each of models 107,109 is based on a global model from global virtual machine 118 modified based on user feedback concerning spam.

Figure 2:
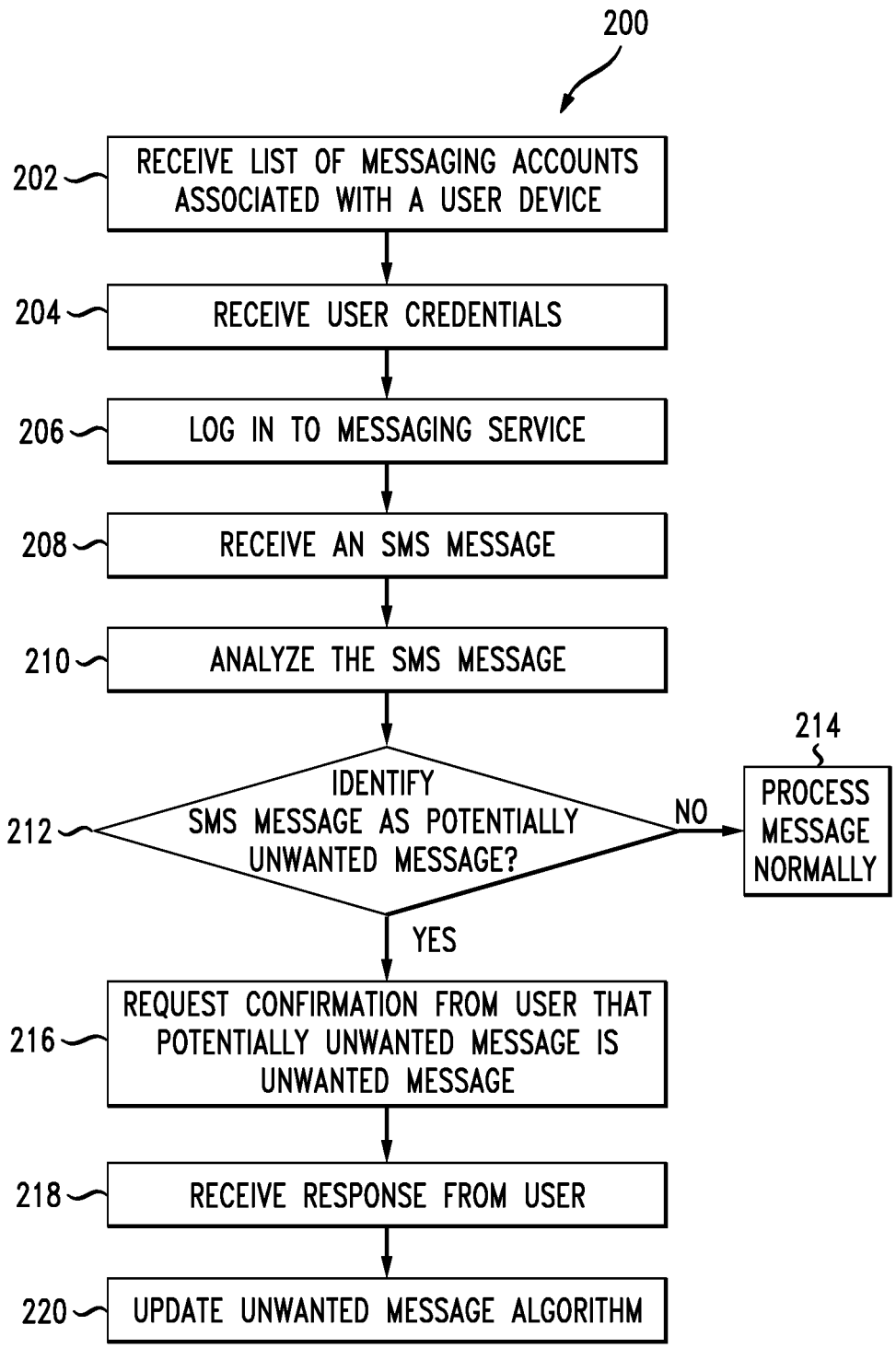
FIG. 2 depicts a flowchart of a method for a cloud based mobile internet protocol messaging spam defense performed by a virtual machine.

FIG. 2 depicts a flowchart of a method 200 for analyzing messages according to one embodiment. FIG. 2 will be described in conjunction with user device 102 and virtual machine 106 of FIG. 1. It should be noted that method 200 may be used with user device 104 and virtual machine 108 in a similar manner. In one embodiment, a program is loaded onto user device 102 in response to a request from a user via user device 102 to use the cloud based mobile internet protocol messaging spam defense system. The program is configured to determine all messaging services used on user device 102. Alternatively, a user may provide information concerning messaging services/apps on the device. A user may also choose which of a plurality of messaging services/apps are to be analyzed for spam. At step 202, a list of messaging services loaded onto user device 102 is received by virtual machine 106 from user device 102.

In one embodiment, the program requests the user credentials (e.g., user name and password) for each of the messaging services/apps that the user would like to have messages analyzed for unwanted messages. At step 204, user credentials transmitted from user device 102 are received by virtual machine 106. At step 206, virtual machine 106 uses the user credentials to log in to one or more messaging accounts supported by messaging servers (e.g., messaging servers 110, 112 in communication with user device virtual machine 106) and retrieve messages intended for delivery to user device 102. Virtual machine 106 then analyzes the messages intended for delivery to user device 102. At step 208, virtual machine 106 receives a message intended for delivery to user device 102. At step 210, the message is analyzed by virtual machine 106 using an unwanted message algorithm (also referred to as model 107, 109). The unwanted message algorithm, in one embodiment, is based on statistical machine learning with initial rules comprising key words in message content and/or user specific data (e.g., contacts in the user's contact list). The unwanted message algorithm, in one embodiment, is updated over time based on user feedback to increase the accuracy of detection. Increasing the accuracy of detection can result in lower rates of detection for various reasons such as the detection of spam resulting in the elimination of a source of spam (e.g., blocking or deleting a user account that has been identified as sending spam).

At step 212, virtual machine 106 determines whether the message is a potentially unwanted message. If the message is not identified as a potentially unwanted message, the method proceeds to step 214 and the message is processed normally. In one embodiment, processing the message normally means that the message is forwarded by virtual machine 106 to user device 102 (i.e., the intended recipient of the message). If the message is identified as a potentially unwanted message, virtual machine 106 transmits a message to user device 102 to request confirmation from the user that the message is an unwanted message. At step 216, confirmation from the user that the potentially unwanted message is an unwanted message is requested from the user by transmitting a confirmation request from virtual machine 106 to user device 102. At step 218, a response from the user is received at virtual machine 106. Based on the user's response to the request for confirmation, the unwanted message algorithm is updated as appropriate.

It should be noted that some messages that a user would consider to be unwanted (e.g., spam) may not be identified as potentially unwanted messages by virtual machine 106 for various reasons. For example, a message may have not yet been identified by any users as an unwanted message. As such, the message would not be identified as a potentially unwanted message by virtual machine 106. A user receiving a message that was not identified as a potentially unwanted message can identify the message as an unwanted message (e.g., spam). In one embodiment, a message delivered to a user device may be identified by the user as an unwanted message using the user device. For example, the message can be displayed to the user via the user device along with a virtual button that can be used to identify the message as an unwanted message. Information concerning the unwanted message can then be transmitted from the user device to a virtual machine associated with the user device. The information can then be used to update the model of the virtual machine to identify similar messages as potentially unwanted messages. In addition, this information can be sent from virtual machine, such as virtual machine 106, to global virtual machine 118, and to XMPP spam detector 122, spam detector 123, and SS7 SMS spam detector 124, which can then identify and filter similar messages as appropriate.

In one embodiment, the unwanted message algorithm may be updated based on various details of the unwanted message. For example, if the message is confirmed by the user to be an unwanted message, the unwanted message algorithm is updated to reflect details of the message. In one embodiment, an address associated with the sender, keywords in the message, content of the message, and/or a content pattern of the message are used to update the unwanted message algorithm. If the message is identified by the user as not being an unwanted message, then the algorithm may be updated to reflect details of the message as previously described. For example, a sender may be categorized as a sender from which the recipient would like to receive messages from. Keywords in the message and the content of the message may also be used to update the unwanted message algorithm to identify keywords in other messages and messages with similar content or a similar content pattern as not being unwanted messages.

In one embodiment, the request for confirmation of step 216 includes presenting the message for review. In one embodiment, this includes presenting the user with the phrase "Confirm as unwanted message?" along with "yes" and "no" buttons for a user to select as an image on a display of user device 102. In another embodiment, a message classified as a potential unwanted message may be placed in a folder, such as a potential unwanted message folder. Potential unwanted messages placed in the potential unwanted message folder may be then be reviewed by a user at a time of the user's choosing. In one embodiment, the potential unwanted message may be presented to a user for review with additional information based on analysis of the message. For example, keywords, the identity of the sender, the date/time the message was sent or received, or other information associated with the message may be highlighted to indicate what factors were considered in identifying the message as a potential unwanted message.

In one embodiment, classification of a message as a potentially unwanted message is based on a set of personalized classification rules and a set of global classification rules received from global virtual machine 118. The set of personalized classification rules, in one embodiment, comprises information pertaining to a list of contacts for a particular user and previous confirmation of unwanted messages by the particular user. In other embodiments, the set of personalized classification rules can be based on a white list, unsolicited messages from outside a contact circle and/or date/time a message is sent or received. The set of personalized classification rules, in one embodiment can be based on information mined through associate rule mining or other techniques. In one embodiment, the set of personalized classification rules can be generated and/or modified by a user. The set of global classification rules are rules that can be used to determine if a message is a potentially unwanted message. In one embodiment, the set of global classification rules are based on one or more features such as a blacklist, message content, an identity of a message sender, date/time a message is sent or received, etc. The set of global classification rules, in one embodiment can be based on information mined through associate rule mining or other techniques. In one embodiment, training messages for generating the set of global classification rules can be based on messages received via crowd-sourcing (e.g., messages identified as spam by other users of the system). If virtual machine 106 determines that the message may be an unwanted message, the message is classified as a potential unwanted message and a user may be prompted for confirmation.

In one embodiment, the algorithm used by a virtual machine can be changed during operation (i.e., the algorithm can be hot swapped). By changing the algorithm at the virtual machine, algorithms can be changed without a noticeable change in operation to the user. In one embodiment, algorithms used by virtual machines can be changed by global virtual machine 118. In addition, algorithms used by virtual machines can be updated based on information determined by global virtual machine 118. For example, if many users identify messages from a particular sender as unwanted messages, global virtual machine 118 can transmit information regarding the particular sender to a virtual machine. This information can then be used by the virtual machine to update a user specific algorithm used by the virtual machine.

Depending on various factors, messages can be prevented from being delivered to a user. One factor is whether the API provided by a messaging server allows a virtual machine to retrieve and forward messages to a user. If the API provided by the messaging server allows the virtual machine to collect and deliver messages to a user device, then the virtual machine can prevent messages identified as spam from being delivered to a user. If the API provided by the messaging server only allows the virtual machine to retrieve copies of the messages to be delivered to a user device, then the virtual machine can only identify messages as spam but will not be able to prevent such spam messages from being delivered to the user device.

Preventing messages from being delivered to a user may also be affected by messaging protocols and the networks via which messages are sent. Three types of information can be derived from messages using voice channel (SS7) SMS. First, an international mobile station equipment identity (IMEI) is a number, usually unique, that can be used to identify a mobile device. Second, an international mobile subscriber identity (IMSI) can be used to identify the user of a cellular network and is a unique identification associated with all cellular networks. The IMSI is used in any mobile network that interconnects with other networks. For global system for mobile communications (GSM), universal mobile telecommunications system (UMTS), and long term evolution (LTE) networks, this number is provisioned in a subscriber identity module (SIM). Third, a mobile station international subscriber directory number (MSISDN) is a number uniquely identifying a subscription in a GSM or UMTS network. It can be considered the telephone number of the SIM card in a mobile/cellular phone. Since this information can be derived for messaging using voice channel (SS7) SMS, such messages can be prevented from being delivered to a user device. Such information is typically not available for messages sent using XMPP. As such, messages sent using XMPP may not be capable of being blocked and other means of spam reduction can be used, such as notifying a business associated with a message server through which such messages pass. In response to such notification, the business can take steps to prevent spam such as blocking or deleting certain user accounts.

Figure 3:
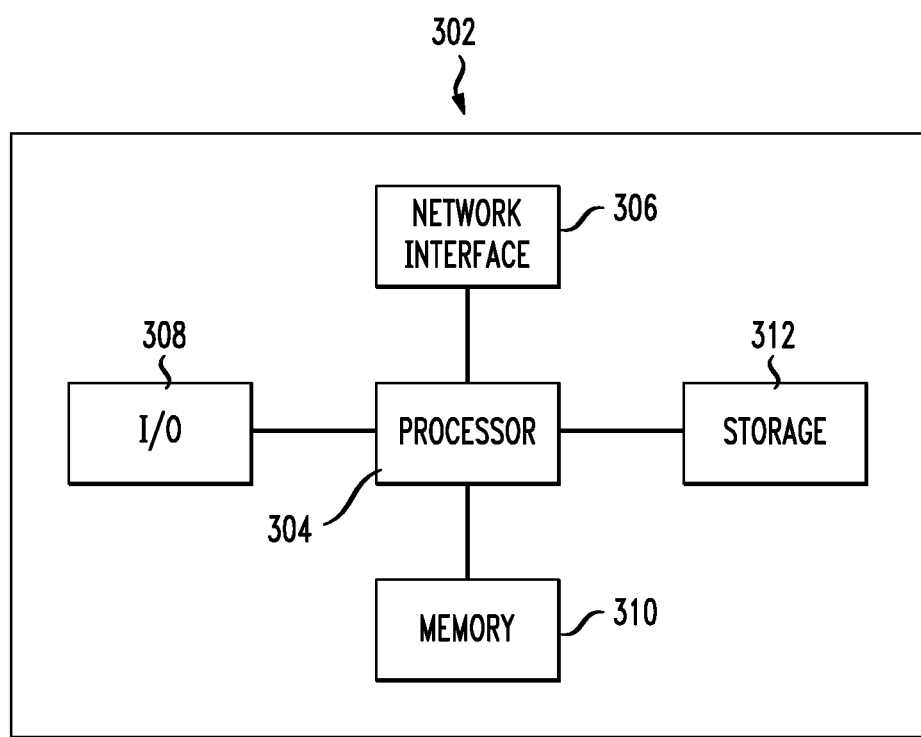
FIG. 3 depicts a high-level block diagram of a computer for a cloud based mobile internet protocol messaging spam defense according to one embodiment.

Mobile devices 102, 104, virtual machines 106, 108, global virtual machine 118, XMPP spam detector 122, spam detector 123, SS7 SMS spam detector 124 may each be implemented using a computer. A high-level block diagram of such a computer is illustrated in FIG. 3. Computer 302 contains a processor 304 which controls the overall operation of the computer 302 by executing computer program instructions which define such operation. The computer program instructions may be stored in a storage device 312, or other computer readable medium (e.g., magnetic disk, CD ROM, etc.), and loaded in to memory 310 when execution of the computer program instructions is desired. Thus, the method steps of FIG. 2 can be defined by the computer program instructions stored in the memory 310 and/or storage 312 and controlled by the processor 304 executing the computer program instructions. For example, the computer program instructions can be implemented as computer executable code programmed by one skilled in the art to perform an algorithm defined by the method steps of FIG. 2. Accordingly, by executing the computer program instructions, the processor 304 executes an algorithm defined by the method steps of FIG. 2. The computer 302 also includes one or more network interfaces 306 for communicating with other devices via a network. The computer 302 also includes input/output devices 308 that enable user interaction with the computer 302 (e.g., display, keyboard, mouse, speakers, buttons, etc.) One skilled in the art will recognize that an implementation of an actual computer could contain other components as well, and that FIG. 3 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:
1. A method, comprising:
 identifying, by a server, a user associated with messages;
 identifying, by the server, a virtual machine that is associated with the user and is executed by the server;
 identifying, by the server, a user-specific algorithm selected by the user requesting a cloud-based spam detection service that is provided by the virtual machine, wherein the virtual machine identifies a potential spam message by analyzing the messages using the user-specific algorithm selected by the user;
 receiving, by the server, a confirmation that the potential spam message is spam; and in response to the confirmation, updating, by the server, the user-specific algorithm selected by the user that requested the cloud-based spam detection service.

2. The method of claim 1, further comprising determining a messaging account associated with the user.

3. The method of claim 1, further comprising determining a messaging account associated with the messages.

4. The method of claim 1, further comprising determining a messaging account associated with the cloud-based spam detection service.

5. The method of claim 1, further comprising determining a sender associated with the potential spam message.

6. A system, comprising:
   a hardware processor; and
   a memory device, the memory device storing instructions, the instructions when executed causing the hardware processor to perform operations, the operations comprising:
   identifying a recipient associated with messages;
   identifying a virtual machine that is associated with the recipient;
   identifying a user-specific algorithm selected by the recipient for a cloud-based spam detection service that is provided by the virtual machine;
   identifying a potential spam message by analyzing the messages using the user-specific algorithm selected by the recipient for the cloud-based spam detection service;
   receiving a confirmation that the potential spam message is spam; and
   in response to the confirmation, updating the user-specific algorithm selected by the recipient for the cloud-based spam detection service.

7. The system of claim 6, wherein the operations further comprise determining a sender associated with the potential spam message.

8. The system of claim 6, wherein the operations further comprise determining a messaging account associated with the recipient.

9. The system of claim 6, wherein the operations further comprise determining a messaging account associated with the messages.

10. The system of claim 6, wherein the operations further comprise determining a messaging account associated with the cloud-based spam detection service.

11. A memory device storing instructions that when executed cause a hardware processor to perform operations, the operations comprising:
    identifying a recipient associated with messages;
    identifying a virtual machine that is associated with the recipient;
    identifying a user-specific algorithm selected by the recipient for a cloud-based spam detection service that is provided by the virtual machine;
    identifying a potential spam message by analyzing the messages using the user-specific algorithm selected by the recipient for the cloud-based spam detection service;
    receiving a confirmation that the potential spam message is spam; and
    in response to the confirmation, updating the user-specific algorithm selected by the recipient for the cloud-based spam detection service.

12. The memory device of claim 11, wherein the operations further comprise determining a sender associated with the potential spam message.

13. The memory device of claim 11, wherein the operations further comprise determining a messaging account associated with the recipient.

14. The memory device of claim 11, wherein the operations further comprise determining a messaging account associated with the messages.

15. The memory device of claim 11, wherein the operations further comprise determining a messaging account associated with the cloud-based spam detection service.

16. The memory device of claim 11, wherein the operations further comprise requesting a credential from a user device associated with the recipient.

17. The memory device of claim 16, wherein the operations further comprise logging into a messaging account using the credential, wherein the messages are associated with the messaging account.

18. The memory device of claim 17, wherein the operations further comprise retrieving the messages from the messaging account prior to a delivery of the messages to the user device.

19. The memory device of claim 16, wherein the identifying of the virtual machine is based on the credential.

20. The memory device of claim 16, wherein the virtual machine is executed by a server to provide the cloud-based spam detection service.

* * * * *